May 8, 1934.  R. CHILTON  1,958,264

VALVE GEAR

Filed May 15, 1930

INVENTOR.
ROLAND CHILTON
BY
ATTORNEY.

Patented May 8, 1934

1,958,264

UNITED STATES PATENT OFFICE 1,958,264

VALVE GEAR

Roland Chilton, Ridgewood, N. J., assignor to Wright Aeronautical Corporation, a corporation of New York Application May 15, 1930, Serial No. 452,594

3 Claims. (Cl. 308—3)

My invention relates to joints as for that form of valve operating mechanism for internal combustion engines generally known as the "push-rod and rocker-arm" type. In this arrangement the sequence of elements is a driven cam, a tappet, a push-rod, a rocker-arm, and the valve. In consequence of the speed at which these parts operate; the difficulty of lubricating parts not connected to the general lubricating system; the comparatively heavy loads carried; the reciprocating motion; and the necessity for making the parts as light in weight, and therefore as small, as possible, there have always been difficulties with consequent progressive wear.

This is particularly true in the case of the modern high speed engines used for aviation. The principal points where lubrication is difficult and excessive wear occurs are the two end joints of the push-rod.

The principal object of this invention is to provide a construction that does not require any lubrication, practically avoids wear by using rolling instead of sliding surfaces where the pressures are heavy, and by using sliding surfaces only where the pressures are negligible.

Other and further objects and advantages of the invention will be hereinafter set forth.

Figure 1:
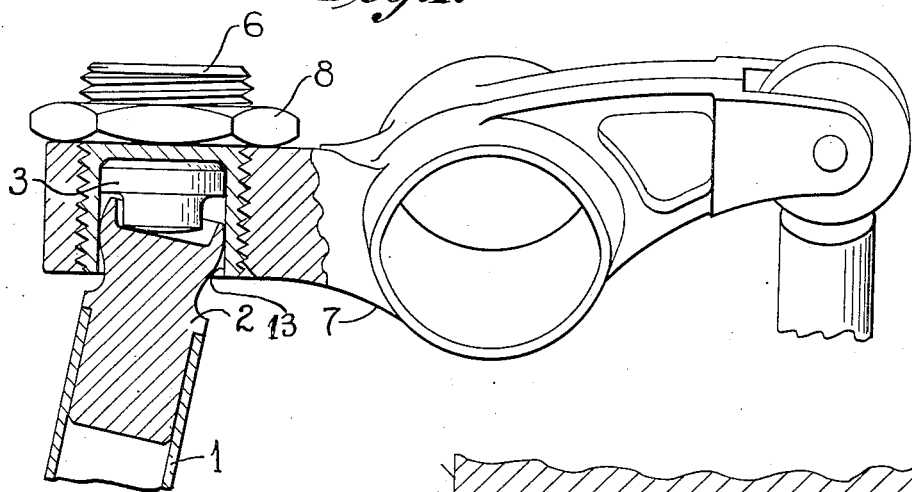
Figures 2, 3:
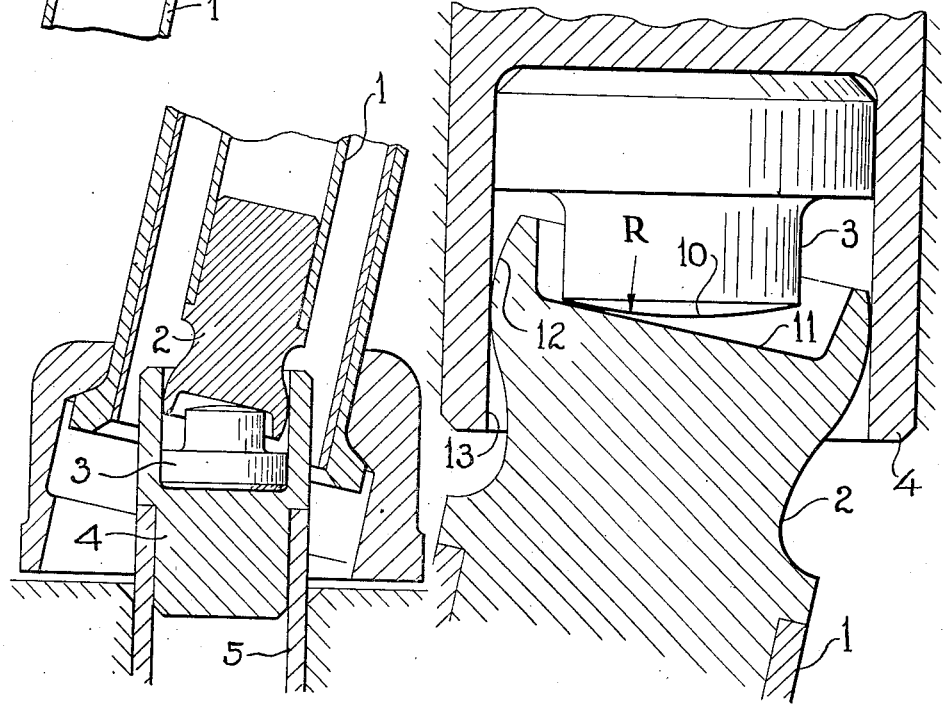

In the drawing, Fig. 1 is a perspective view, with a part of the structure shown in section, of the rocker arm and its associated parts;

Fig. 2 is a sectional view showing the construction of the joint between the cam follower and the push rod, and Fig. 3 is an enlarged sectional view showing the joint between the push rod and the rocker arm.

Similar numbers refer to similar parts in all figures.

Referring to the drawing, 1 is the usual tubular push-rod, 2 is one member of the joint and 3 is the co-acting member. 4 is the upper part of the tappet and third member of the tappet joint. 5 is the body of the tappet carrying the cam roller, not shown. 6 is the third member of the rocker-arm joint which is adjustable in the usual manner in the end of the rocker-arm 7, and locked in position by the lock nut 8.

The form of connection most used has been some form of ball and socket joint. In this type of joint the friction is wholly sliding, the bearing surface is necessarily small, unit pressures are high, and adequate lubrication difficult. Further, the high frequency of the reciprocating motion tends to throw the lubricant away from the joint.

My improved joint consists essentially and preferably of three pieces as shown to an enlarged scale in Fig. 2. Piece 3 has a spherical surface 10 of radius R. This radius, which is comparatively large, is determined by the desired or required range of angular motion. Piece 2 is made with the flat surface 11 which rolls on the spherical or cylindrical surface 10 as the push-rod is deflected in operation.

In order to maintain the surfaces 10 and 11 in proper relation piece 2 is guided by the internal cylindrical surfaces 13 of piece 4 of the tappet joint and piece 6 of the rocker arm joint. The ball like end of piece 2 is so shaped that its surface 12 slides on surface 13 while 11 rolls on 10, without slippage. This surface 12 is an involute in axial section with a base circle of radius R.

As the forces at the point of contact between the surfaces 10 and 11 are axial in consequence of the surfaces 11 being parallel, the side thrust that has to be resisted by the surfaces 12 and 13 is practically negligible, and the cylindrical surfaces 13 of pieces 4 and 6 function mainly as guides to hold pieces 2 and 3 in proper relative position against the various extraneous forces tending to displace them. The pressure between 2 and 4 and 2 and 6 is so light, the arc of contact so great, and the amplitude of motion so small that lubrication has been found to be unnecessary.

All the contacting surfaces of pieces 2, 3, and 4 are hardened, ground and polished and are not appreciably deformed by the working stresses.

While I show the preferred form it is obvious that modifications of design and arrangement of the essential parts could be made without departing from the essence of the invention.

What I claim is:

1. In an engine, in combination, a movable part having a contact surface, a part movable both with and with respect to said first mentioned part, said last mentioned part having a surface adapted for rolling contact with said first mentioned surface, and a cooperating pair of continuously engaging guide surfaces formed, one upon each said part, to constrain the first said surfaces to pure rolling contact, one said guide surface being a substantially spherical surface and the other said guide surface being a substantially cylindrical surface, and both said guide surfaces being so related to said first mentioned surfaces as to receive the latter wholly within their embrace.

2. In an engine, in combination, a movable part, a part bearing thereon and movable both with and with respect to said movable part, each of said parts having co-acting thrust surfaces for axial loads, said thrust surfaces being restrained to rolling contact with each other; guiding means for restraining said thrust surfaces to rolling contact, said guiding means consisting of a substantially cylindrical guiding surface surrounding and movable with the thrust surface of one said movable part, and a substantially spherical guiding surface, surrounding and movable with the thrust surface of the other said movable part; said guiding surfaces being so formed that they are in constant line contact one with the other under all operating conditions, and the plane of said line contact intersects the axis of that movable part bearing the substantially cylindrical guiding surface normal to said axis and tangential to the thrust surface of said movable part bearing the cylindrical guiding surface.

3. In an engine, in combination, a pair of members having coacting thrust surfaces adapted for rolling contact with each other, a cylindrical guide surface on one member encircling one said thrust surface, and a substantially spherical guide surface on the other member encircling the other said thrust surface and engageable with said cylindrical guide surface for restraining said thrust surfaces to rolling contact, the point of contact of said thrust surfaces lying substantially in a plane passing through the points of engagement of said spherical and cylindrical guide surfaces.

ROLAND CHILTON.